United States Patent [19]

Sump

[11] Patent Number: 4,969,271
[45] Date of Patent: Nov. 13, 1990

[54] MAP READING AND PLOTTING INSTRUMENT

[76] Inventor: Mallory L. Sump, 503A Sladen Pl., West Point, N.Y. 10996

[21] Appl. No.: 312,036

[22] Filed: Feb. 17, 1989

[51] Int. Cl.$^5$ ............................................. B43L 13/00
[52] U.S. Cl. ...................................... 33/431; 33/471; 33/1 SD
[58] Field of Search ................ 33/1 C, 1 N, 431, 471, 33/150, 465, 472; 235/65, 78 N, 88 N, 116

[56] References Cited

U.S. PATENT DOCUMENTS

| | | | |
|---|---|---|---|
| 905,249 | 12/1908 | Townsend | 33/470 |
| 2,003,172 | 5/1935 | Burt | 33/1 N |
| 2,039,333 | 5/1936 | Musham | 33/1 N |
| 2,477,556 | 7/1949 | Shaw | 33/1 SD |
| 2,545,935 | 3/1951 | Warner | 33/431 |
| 2,996,242 | 8/1961 | Bannister | 235/78 N |
| 3,059,339 | 10/1962 | Danforth | 33/1 SD |
| 3,432,927 | 3/1969 | Springer | 33/1 SD |
| 3,855,706 | 12/1974 | Price | 33/431 |
| 4,359,628 | 11/1982 | Lambert | 33/431 |
| 4,625,409 | 12/1986 | Arakawa | 33/1 N |

FOREIGN PATENT DOCUMENTS 443421 12/1948 Italy ........................................ 33/471

Primary Examiner—Thomas B. Will
Attorney, Agent, or Firm—McGlew and Tuttle

[57] ABSTRACT

The map reading and plotting instrument comprises two transparent discs coaxially held together by a hollow fastener for rotary motion relative to each other and two transparent arms disposed between and extending radially of the discs and secured by the hollow fastener for pivotal movement relative to each other and the discs. The top disc has a sight-slide subassembly consisting of a plurality of first scales of linear measure and a sight-slide moveable relative to the first scales. The bottom disc has adjacent its periphery a plurality of scales of angular measure while each of the arms has a plurality of scales of linear measure extending from the hollow fastener longitudinally to the distal end thereof. The top disc has a north-south diametral line which coacts with a declination scale of the bottom disc to effect orientation of the instrument with the magnetic north as shown on a map having grid azimuths and/or a declination diagram.

17 Claims, 4 Drawing Sheets

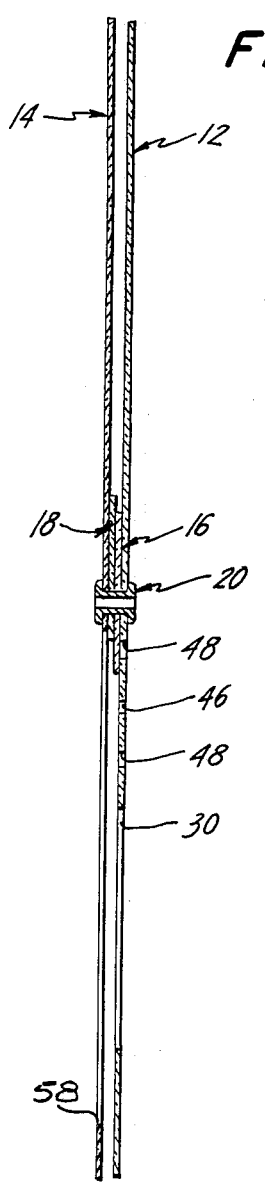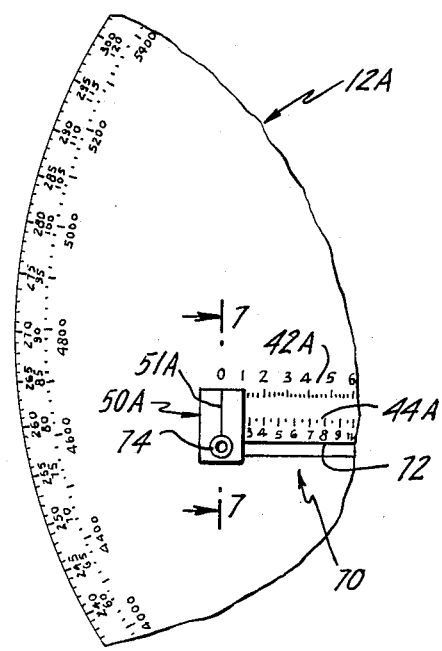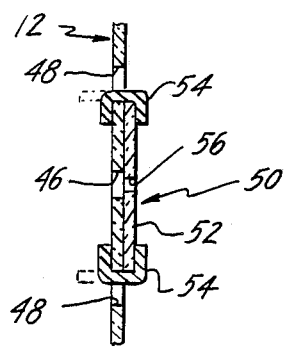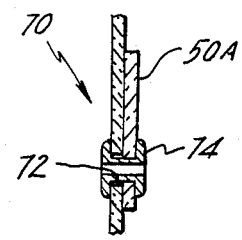

MAP READING AND PLOTTING INSTRUMENT

This invention relates to calculating instruments and more particularly to a map reading and plotting instrument for maps having grid azimuths and/or a declination diagram based on the universal transverse mercator projection of the earth.

BACKGROUND OF THE INVENTION

Heretofore, known instruments for aiding in the use of maps, such as exemplified in the Hotchkiss U.S. Pat. No. 4,337,577 dated July 6, 1982 and Lambert U.S. Pat. No. 4,359,628 dated Nov. 16, 1982, are very limited in their usefulness, particularly for military purposes. One such limitation is that they are applicable to a single scale map because each instrument is calibrated for use with one of several military scaled maps, as for example 1:25,000, 1:50,000 or 1:125,000. Another limitation of known instruments, particularly for military uses, is that the user has a need in the effective use of a map to make arithmatical computations and, therefore, military recruits must undergo extensive training in map reading. Some of the arithmatical computations involve converting magnetic azimuths to grid azimuths and conversion to back azimuths when it is desired to locate on the map an unknown point from two known points, which functions are referred to as "resection" and "intersection." Also, in determining the total distance along a sinuous path, e.g. a road or railroad track, the user must add the straight portions of the path between the curved portions. A further limitation of known map reading devices is that the artillery uses instruments in which angular directions are measured in mils rather than degrees for more accurate aiming of the weapons. Thus, artillery personnel and those spotting for artillery units must have special map reading and plotting instruments. Obviously, where in the use of heretofore known map reading instruments computations are required, the need for paper and/or a writing implement poses a problem, particularly under actual field conditions where paper and a writing tool is not ,always available to the map user. Also, map reading and plotting instruments of heretofore known types require the user to draw lines on a map and, in absence of available paper, the user may use the map for making computations. These writings on a map lead to short map life and leaves marks which, even if erased, are visible or can be made visible and may give aid to an enemy if the map is captured. These aforementioned limitations and others have been eliminated by the map reading and plotting instrument of the present invention wherein the instrument has a more universal use, automatically performs the calculations and can be used by a person having minimal training in its use. Also, it is desirable, particularly for military use, that the map reading and plotting instrument be of relatively rugged construction and compactness. It should also be made of a transparent material to permit map features to be seen when the instrument, in its use, is placed on the map.

Accordingly, it is an object of this invention to provide an improved map reading and plotting instrument which is capable of being used with a plurality of maps of different scale. Another object of the present invention is to provide an improved map reading and plotting instrument which is compact and sturdy and is therefore particularly useful in the military. A further object of this invention is to provide an improved map reading and plotting instrument which can be effectively used by persons having very little instructions in its use. A still further object of this invention is to provide an improved map reading and plotting instrument capable of performing a multiplicity of functions automatically.

SUMMARY OF INVENTION

Now therefore, the improved map reading and plotting instrument according to this invention comprises two transparent discs disposed coaxially one above the other for independent rotation and two independently pivotal arms, all of which are secured for rotative movement by a common fastener located at the center of the discs. The discs and the arms are relatively thin in thickness, for example about 1/32 of an inch or 0.079 centimeters, accordingly the arms are preferably disposed between the discs to protect the arms against accidental damage. The arms are dimensional in length so that the distal end portion lies slightly beyond the peripheries of the discs and thereby enable the arms to be engaged by the user for pivotal movement. One of the discs has adjacent to its periphery at least one scale of angular increments while the other disc carries a first diametral line representing a north-south axis and a second diametral line extending perpendicular to the first line representing an east-west axis. Each of the arms have at least one scale of linear measure extending from the pivot point thereof to the distal end portion.

In a narrower aspect of this invention the improved map reading and plotting instrument is constructed and arranged for use with maps having grid azimuths and a declination diagram thereon so as to have usefulness with a broad range of scaled maps and to perform a multiplicity of functions automatically without the need of arithmatical computations. It is characterized by its simplicity and compact arrangement of component parts and a combination of elements permitting its use by relatively untrained persons in connection with a plurality of different scaled maps and to perform a multiplicity of functions.

A feature of this invention is the two pivotal arms which permits the automatic location of an unknown point from two known points identifiable on a map either of two plotting functions known as "intersection" and "resection".

Another feature of this present invention are two coextensive, parallel scales of different increments of linear measure at least one of which corresponds to the scale of the map on which it is to be used on the top disc and a slide-sight mounted on the top disc for movement coextensive with and relative to the two scales. This scale is used to measure the length of a topographical feature on a map, such as the sinuous path of a road or railroad bed by successively measuring the straight portions between curved portions of the path which is accomplished by movement of the slide along successive straight portions to the point desired, the final slide position automatically providing the summation of the lengths of the straight portions as read from the appropriate scale,

BRIEF DESCRIPTION OF THE DRAWINGS

The invention will be more fully understood from the following description thereof when considered in connection with the accompanying drawings wherein an embodiment of the invention is illustrated by way of example and in which:

FIG. 2 is a cross sectional view taken along line 2—2 of FIG. 1;

FIG. 5 is an enlarged fragmentary, cross sectional view taken along 5—5 of FIG. 3 showing one type of a sight-slide scale subassembly according to this invention;

FIG. 6 is a fragmentary plan view of an alternative sight-slide scale subassembly; and FIG. 7 is a view in cross section taken along line 7—7 of FIG. 6, somewhat enlarged.

THE DESCRIPTION OF THE PREFERRED EMBODIMENT OF THE INVENTION

Figure 1:
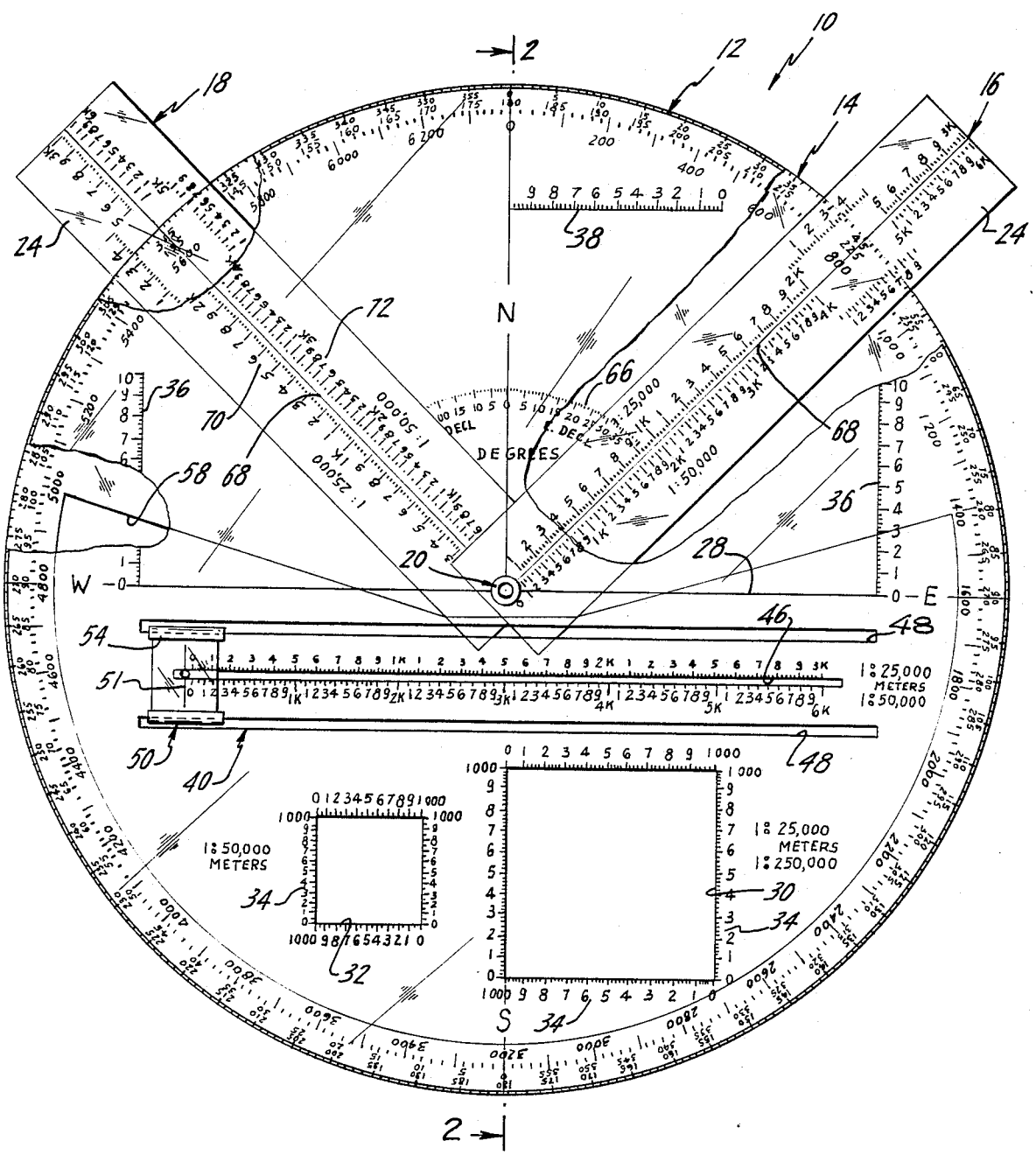
FIG. 1 is a top plan view of the improved map reading and plotting instrument according to this invention with parts broken away for illustration purposes only.

Now, referring to the drawings and more specifically FIGS. 1 and 2, the improved map reading and plotting instrument according to this invention is generally designated by the reference number 10. The basic component parts of instrument are a top disc 12 of transparent material arranged in coaxial relationship with a bottom disc 14 of transparent material and two transparent arms 16 and 18 disposed between top disc and bottom disc 14 and extending radially relative to the discs. The discs 12 and 14 and arms 16 and 18 are all connected together for relative rotary movement by a hollow fastening means, as for example a hollow pin or rivet 20, as shown. The rivet 20 extends centrally of both discs 12 and 14 and through one end portion of each of the arms 16 and 18 to support the arms for pivotal movement relative to each other and to discs 12 and 14. The discs 12 and 14 and arms 16 and 18 are about 1/32 of an inch or about 0.079 centimeters in thickness and are made of a transparent plastic material as for example, polycarbonate film, or plexiglass. The discs 12 and 14 are substantially the same diameter and of a size of about 7.5 inches or about 18.75 centimeters in diameter. As is shown, discs 12 and 14 are preferrably of slightly different diameters to facilitate rotation of the discs relative to each other. Top disc 12 could be made slightly smaller in diameter than bottom disc 14, about 1/32 of an inch or about 0.079 centimeters. Each of the arms 16 and 18 are dimensioned in length as for example about 5 inches or about 7.5 centimeters, so that their respective distal end portions 24 project beyond the peripheral edges of discs 12 and 14. With end portions 24 of arms 16 and 18 lying outside the peripheral edges of the discs, a user may grasp each of the arms for relative pivotal movement with respect to each other and discs 12 and 4. At the same time since a substantial portion of each of the arms 16 and 18 lies between discs 12 and 14, the arms are shielded by the discs against inadvertent bending or breakage.

Top Disc

Figure 3:
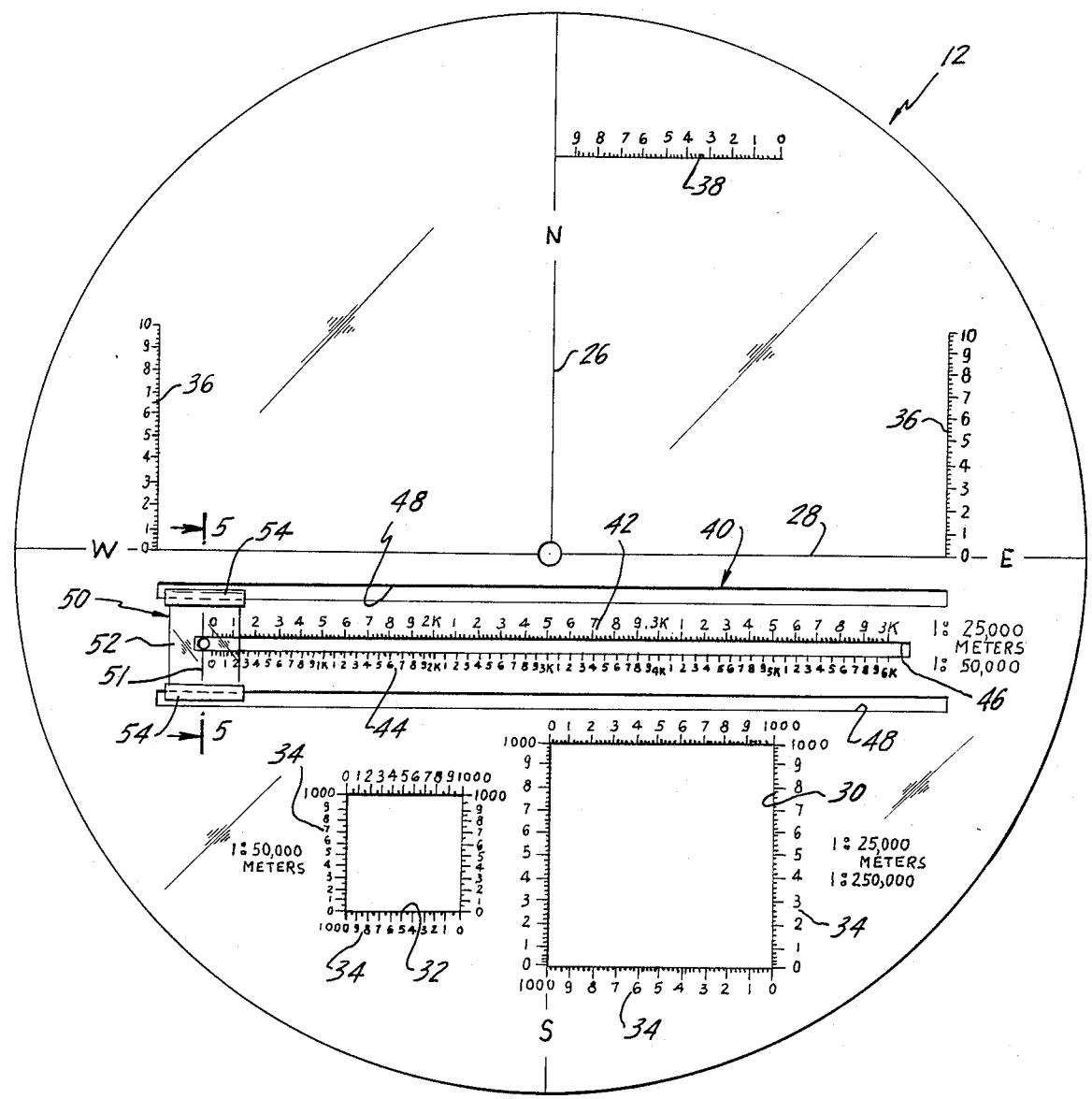
FIG. 3 is a plan view of the top disc of the improved map reading and plotting instrument shown in FIG. 1.

The top disc 12, as clearly shown in FIG. 3, comprises a north-south diametral line 26 and an east-west diametral line 28 extending normal to the north-south line 26, which permits instrument 10 to be properly orientated with respect to the north-south, east-west directions of a map, not shown. As is well known a map may have thereon a means for designating north which may be merely a line indicating magnetic north or be a declination diagram, common on military maps, showing the direction of grid north, true north and magnetic north. Also, disc 12 has two cut-out portions 30 and 32 of square shape adjacent each side of which are scales of linear measure 34 dividing each side into smaller increments, as for example into meters. Cut-out 32 and its associated scales 34 are proportioned to be useable with maps having grid azimuths thereon and of 1:50,000 scales while cut-out 30 and its associated scales 34 are proportioned for use with maps having grid azimuths thereon and of a scale of 1:25,000 and 1:250,000 ratios. This feature enables a user of instrument 10 to more precisely identify a place on a map in terms of subdivisions of grid azimuths and communicate this to someone else. In addition, top disc 12 has two scales of linear measure 36 which extend perpendicularly from east-west diametral line 28, and, of course, parallel to the north-south diametral line 26 for measuring the distance from the east-west diametral line 28 to the nearest east-west grid line on a map. Similarly, a linear scale 38 extending perpendicularly from the north-south diametral line 26 and parallel to the east-west diametral line 28 is useable for measuring the distance from the north-south diametral line 26 to the nearest north-south grid line on a map. The scale 34 adjacent one side of cut-out 30 and, which extends parallel to scale 38, can be used for the same purpose as scale 38. One more component of top disc 12 is a sight-slide scales subassembly 40.

Sight-Slide Subassembly

The sight-slide scale subassembly 40 according to one embodiment comprises, as best shown in FIGS. 1 and 5, two linear scales 42 and 44 of different increments of linear measure which are disposed adjacent to the opposite sides of a slot 46. The scale 42, as shown is in kilometers for maps scaled to a ratio of 1:25,000 while scale 44 is in kilometers for maps scaled to a ratio of 1:50,000. Adjacent each of the scales 42 and 44 is a slot 48. These slots extend parallel to and are slightly larger in length than scales 42 and 44 and slot 46. A sight-slide 50 is constructed and arranged for slidable movement relative to scales 42 and slot 46. The sight-slide 50 comprises a transparent, flat plate 52 attached at opposite ends to brackets 54 and disposed to lie flat against the face of top disc 12. When attached to disc 12, each of the brackets 54 is U-shaped in cross section (see FIG. 5) The brackets 54 prior to attachment are L-shaped so that, in the assembly process, one leg of each of the brackets (partially shown in phantom lines in FIG. 5) is passed through a slot 48 and then bent to engage the face of top disc 12 opposite from its face engaged by plate 52. Thus, brackets 54 snuggly embrace top disc 12 adjacent slots 48 but not so tightly as to prevent easy slidable movement of sight-slide 50 in slots 48 relative to scales 42 and 44. A hole 56 is provided in plate 52 in register with slot 46. The sight-slide 50 has a sight-line 51 which extends parallel to increment markings of scales 42 and 44 and through the center of hole 56. This hole 56 serves to allow an implement, as for example, a pencil, pen or leg of a pair of dividers to be inserted to effect movement of sight-slide 50 relative to scales 42 and 44 and/or to place a mark or marks on the map. To facilitate the aforementioned marking of a map and to marking a map in connection with other uses of instrument 10, as for example, using grid subdivision cut-outs 30 and 32, bottom disc 14 is provided with a large cut-out portion 58.

Bottom Disc

Figure 4:
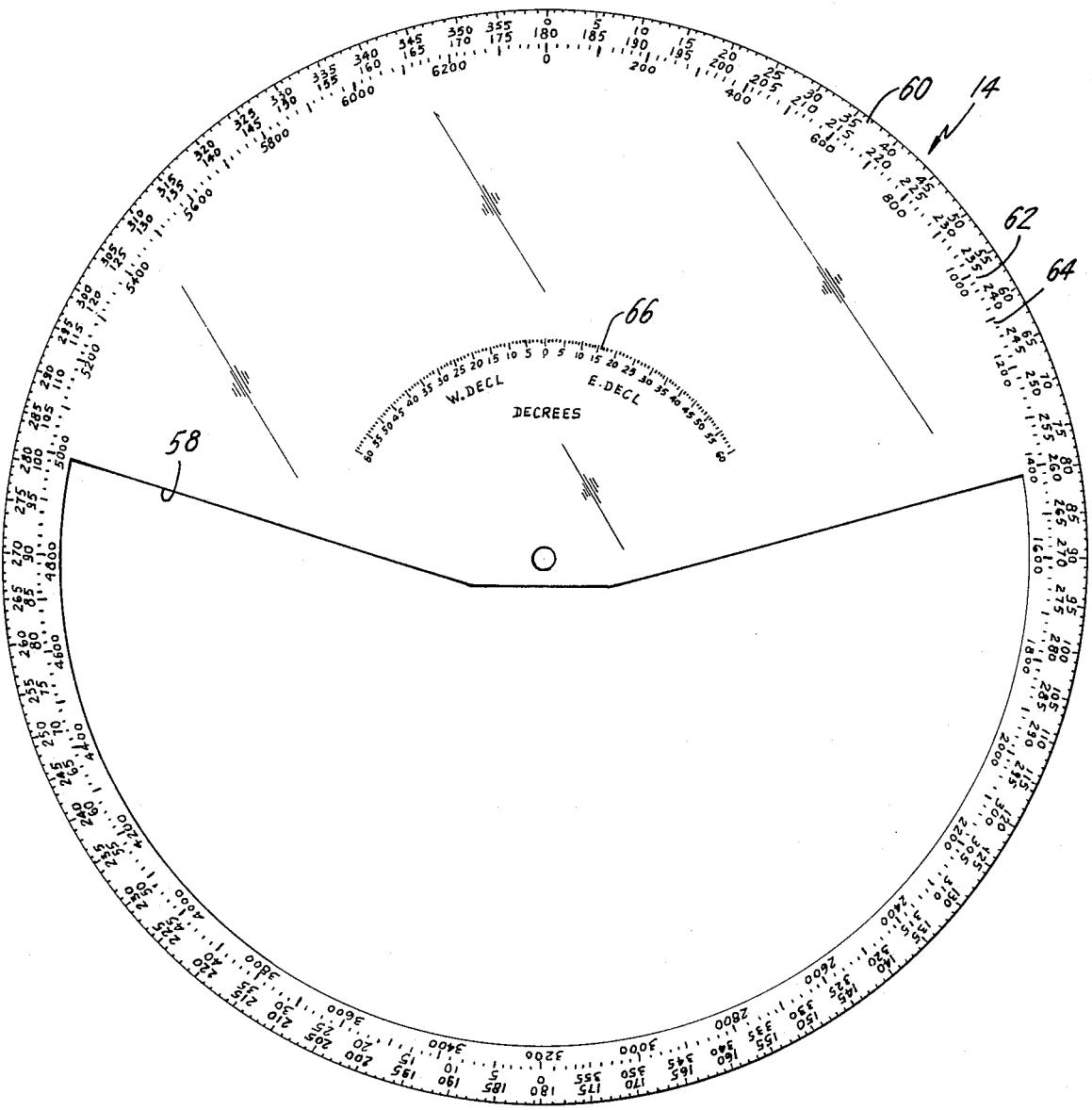
FIG. 4 is a plan view of the bottom disc of improved map reading and plotting instrument, shown in FIG. 1.

The bottom disc 14 as is best shown in FIG. 4 has, in addition to the cut-out portion 58, three scales 60, 62, and 64 adjacent the periphery of the disc. Each of the scales 60, 62, and 64 are increments of angular measure. The scale 60 consists of angular increments in degrees while scale 62 provides the degrees of back azimuth corresponding to the degree markings of scale 60. Thus, the user of instrument 10 need not add or subtract 180 degrees from the degrees of scale 60 to obtain degrees of back azimuth. The scale 64 is a mil scale which divides the circle or 360 degrees into 6400 mils. This scale 64 more precisely divides a circle and is, therefore, used by the artillery to enable more accurate directed artillery fire. In addition, bottom discs 14 has a declination scale 66 consisting of two equal segments extending from 0° degrees to 60° degrees on either side of the north-south diametral line 26 (see FIG. 1). The declination scale 66 is important in that it permits instrument 10 to be orientated to a map having a declination diagram (not shown) which indicates the angular difference between true north, magnetic north and grid north. It must be understood that the angular difference between the three north directions vary from location to location on the earth and hence from map to map to a maximum of 60°. Therefore, the instrument 10 has to be orientated to the map being used. To orientate instrument 10 to a particular map in use, top disc 12 is rotated so that north-south diametral line 26 is placed on the appropriate east or west declination degree of scale 66 as indicated on the map and bottom disc 14 is then rotated relative to top disc 12 so that 0° on scale 60 coincides with the north-south diametral line 26. Once this is accomplished and instrument 10 is placed on the map where the user is located and in alignment with map grid lines (not shown) the instrument 10 automatically provides magnetic cox pas headings to other points on the map and back azimuth readings from those points by reading scales 60 and 62. If the direction is to be defined in mils then the user can read from mil scale 64. To assist the user in making such magnetic or mil scale readings, each of the arms 16 and 18 is provided with a longitudinally extending sight-line 68.

Pivotal Arms

In FIG. 1 it is clear that arms 16 and 18 are identical and, therefore, only arm 16 will be described in detail. The arm 16 is flat, rectangular shaped member made from transparent material. Arm 16, in addition to sight-line 68, has at least one linear scale, but, as shown, has preferrably two scales 70 and 72 of linear measure, as for example, in metric increments so that linear distances can be measured in terms of metric measure on maps of 1:25,000, 1:50,000 and 1:250,000 scale, the basic scales of maps for military use. Thus, instrument 10 can provide the user, as aforesaid, the magnetic heading and back azimuth readings to a point on a map as well as the straight line distance to that point as read from scale 70 or 72 of arm 16. This function is commonly referred to as a "polar plot".

The instrument 10 by use of arms 16 and 18 is capable of locating an unknown point on a map automatically by two processes known in the art as "resection" and "intersection". The technique of resection is employed to determine the users location on a map, when unknown, from two other known points which can be visually identified on the ground from the users location. This is accomplished by first adjusting the instrument to magnetic north as required by the declination diagram on the map to be used. Thereafter positioning the instrument 10 on the map with one arm 16 or 18 pivotally moved so that sight-line 68 thereon intersects one of the known points and the magnetic compass direction shown on scale 60 for that point. Similarly, the other arm 16 or 18 is pivotally moved to the magnetic compass direction as shown on scale 60 to that other known point so that its sight-line 68 intersects that magnetic compass reading and the known point. Where the two sight-lines 68 of the respective arms 16 and 18 intersect or resect, namely the center of rivet 20, is the location of the unknown point on the map, the coordinates thereof being readable from the back azimuth scale 62. Obviously, the location of this unknown point is achieved automatically without arithmatical coxputations involving computations to back azimuths, declinations computations, etc. The technique of intersection again employs the use of arms 16 and 18 and is for obtaining the coordinates of an unknown point on a map when the users position is known and another point on the map is known and visually identifiable from the ground. The instrument 10, after adjustment for magnetic declination, is placed with the hollow rivet 20 centered on the unknown point as shown on the map which is in use (not shown) and orientated with the grid lines of the map. As before, one of the arms 16 or 18 is pivotally moved to align its sight-line 68 to intersect the corresponding back azimuth of the magnetic compass reading as shown on scale 62 and the known point or location of the user on the map. The other arm is then pivotally moved so that its sight-line 68 intersects one of the magnetic coordinates of the other known point as shown on scale 60. Where sight-lines 68 intersect scale 60 are the magnetic direction coordinates of such unknown point without the necessity for mathematically converting magnetic azimuth to back azimuth and the mathematics of computing a resection.

Alternative Sight-Slide Subassembly

In FIGS. 6 and 7 is shown an alternative sight-slide subassembly 70 and basically differs from sight-slide subassembly 40 shown in FIG. 1, in that it has only one elongated slot 72 rather than the three slots 46 and 48 of the embodiment of FIG. 1. Accordingly, the parts of subassembly 70, corresponding to like parts of subassembly 40, will be designated by the same reference number, but with a suffix A added thereto.

The sight-slide subassembly 70, in addition to single slot 72 comprises sight-slide 50A and linear scales 42A and 44A, identical to scales 42 and 44 of subassembly 40, but with both scales 42A and 44A disposed adjacent one side of slot 72 and extending parallel to the latter. The sight-slide 50A comprises a rectangular flat, transparent slide plate 52A which is secured to a hollow rivet 74. The sight-slide 50A has a sight-line 51A which extends longitudinally through the center of rivet 74. The rivet 74 extends through slot 72 and is deformed or upset against the underface of top disc 12A to hold the sight-slide 50A to top disc 12A. The deformation of rivet 74 is such that sight-slide 50A is firmly held to top disc 12A but is free to be moved relative to top disc 12A with slot 72 serving to guide the sight-slide 52A in such movement.

The sight-slide subassemblies 40 and 70 each function to provide the user of instrument 10, with the ability to measure the distance along a sinuous path shown on a map, as for example, a road, stream, railroad bed and the like. This is accomplished by placing instrument 10 on the map so that sight-slide 40 or 79 is placed with hole 56 or the hollow core of 74 of the associated sight-slide 51 or 51A and placing such hole at the starting point on the sinuous path of the distance to be measured and the zero mark of the appropriate scale 42 or 44A. Thereafter, moving sight-slide 40 or 70 along a first straight portion of the path to be measured. Then, repositioning the sight-slide as aforesaid to the next straight portion of the path and moving the sight-slide to the end of the next straight portion. These steps are followed for successive straight portions until the sight-slide is moved to the end of the last straight portion of the distance-to be measured. These successive steps of indexing the sight-slide automatically provides the user with a summation of the straight portions of the distance along a sinuous path being measured by observing where sight-slide 51 or 51A crosses the appropriate scale 42, 42A, or 44, or 44A. To the summation of the straight portions an estimate of the distance along the curved portions can be added to provide the total distance of the sinuous path measured.

It is believed now apparent to those skilled in the art that the present invention provides an improved map reading and plotting instrument which is useful in connection with a plurality of different scaled maps. It is an instrument for carrying out a multiplicity of map reading and plotting functions automatically and with a minimum of arithmatic computations. It is also an instrument which is capable of use with a minimum of training. It is further characterized by its relative simplicity of design, rugged construction, the compact arrangement and assembly of its component parts, and the exceptional facility with which it can h=operated and applied to a multiplicity of map reading and plotting purposes.

Although two embodiments of the invention have been illustrated and described in detail, it is to be expressly understood that the invention is not limited thereto. Various changes can be made in the arrangement of parts without departing from the spirit and scope of the invention as the same will now be understood by those skilled in the art. As for example, linear scales 42, 44, 42A, 44A while shown and described and as being in metric linear measures may be in English linear measures, if so desired, without departure from the scope and spirit of this invention.

What is claimed is:

1. A map reading and plotting instrument for use with a scaled map having a declination diagram comprising:
   (a) a first transparent disc having adjacent its periphery at least one first scale means dividing the periphery into increments of angular measure;
   (b) a second transparent disc coaxially aligned with said first disc, said second disc being disposed on the bottom of said first disc, said second disc including a cut out portion;
   (c) said second disc having a north-south diameter line to orientate the instrument with respect to either true north, magnetic north or grid north of the map;
   (d) a hollow securing means for connecting together said first and second discs at their respective centers for rotative movement independent of each other;
   (e) at least one arm of flat, rectangular configuration and having at least one second scale means consisting of increments of linear measure corresponding to the scale of the map;
   (f) said arm being disposed between said first and second discs and secured adjacent one end thereof to said hollow securing means for pivotal movement independent of the first and second discs; and
   (g) said first disc has at least one third scale means of linear measure extending from a first location on said first disc to a second spaced-away second location, said third scale means corresponding to the scale of the map; and
   (h) a sight and sight connection and guide means for connecting said sight to said first disc and guiding said sight along a guide path between said first and second location for movement relative to said third scale means and an opening provided in said sight, said opening being positionable over said cut out portion for accessing said map through said opening.

2. The device of claim 1 wherein said one first scale means includes three concentric scales one in degrees, another in degrees of back azimuths, and the other in mils.

3. The device of claim 1 wherein said arm is of a length so that its distal end projects beyond the peripheral edges of said first and second discs to facilitate its being grasped by the user for pivotal movement.

4. The device of claim 1 wherein a second arm is provided and secured for pivotal movement at its one end portion to said hollow pivot means and wherein said second arm includes arm scale means.

5. The device of claim 4 wherein each of said second scale means and said arm scale means consists of two scales of linear measure proportional to map scales of 1:25,000, 1:50,000 and 1:250,000.

6. The device of claim 4 wherein each of said arms are of a length so that the distal end thereof extends beyond the peripheral edges of said discs.

7. The device of claim 1 wherein said one third scale means has a plurality of linear scales corresponding to a plurality of map scales.

8. A map reading and plotting instrument for use with scaled maps having grid azimuth and a declination diagram comprising:
   (a) a first and second transparent disc coaxially disposed adjacent each other, said second disc being disposed on the bottom of said first disc, said second disc including a cut out portion;
   (b) a hollow means for securing together said first and second discs for rotative movement relative to each other;
   (c) two transparent, flat, elongated arms connected to said first and second discs and each secured to said hollow securing means for a pivotal movement independent of each other and said first and second discs;
   (d) said second disc having three first scales of angular increments disposed adjacent the peripheral edge of said second discs;
   (e) each of said arms having two second scales of linear measure corresponding to the said map scales;
   (f) each of said two second scales of linear measure extending radially from said hollow securing means; and
   (g) said first disc having a north-south diametral line extending through the center thereof to orientate the map reading and plotting instrument with one of said scaled maps;

(h) said first disc having two co-extensive scales of linear measure corresponding to different map scales, said two coextensive scales extending from a first location to a second location on said first disc;

(i) a square scale cutout defined by said fist disc, said square scale cutout being positionable over said cut out portion for accessing said map through said second disc cutout portion (i) a sight slide mounted to said disc along a track defined by said disc, said track running substantially parallel to said two co-extensive scale, an opening being provided in said sight slide, said opening being positionable over said cut out portion for accessing said map through said opening.

9. The instrument of claim 8 wherein each of said arms are rectangular in plan view and relatively thin in thickness and are dimensioned in length so that the distal end portion lies beyond the peripheries of said first and second discs and thereby enables the arm to be engaged by the user for pivotal movement.

10. The instrument of claim 8 wherein said first and second discs are arranged so that the first disc is on top and the second disc on the bottom and wherein said bottom disc has a declination scale thereon.

11. The instrument of claim 10 wherein said cut out portion is a large arcuate cut-out portion to permit the user direct sighting of or contact with the map through the top disc.

12. The map and plotting instrument for use with scaled maps of 1:25,000 1:50,000 and 1:250,000 each of which have grid azimuths and a declination program, comprising:

(a) a top and bottom transparent disc coaxially disposed adjacent each other, said second disc being disposed on the bottom of said first disc, said second disc including a cut out portion;

(b) each of the top and bottom discs having flat planar surfaces and being of about 0.079 centimeters in thickness;

(c) two flat, rectangular, transparent arms disposed radially relative to said top and bottom discs;

(d) a hollow pivot post extending centrally of the top and bottom discs and through one end portion of each of the two arms to secure the top and bottom discs and arms together for independent rotation of the top and bottom discs and pivotal movement of the arms independently of each other and the top and bottom discs;

(e) each of said arms being dimensioned in length so that the distal end lies beyond the periphery of the top and bottom discs;

(f) said top disc having a north-south diametral line extending through the center thereof;

(g) said bottom disc having three first scales of angular increments disposed concentrically adjacent the peripheral edge of said top disc and having a declination scale;

(h) each of said arms having two second scales of linear measure capable of use with each of the three map scales;

(i) said first disc having two co-extensive scales of linear measure corresponding to different map scales, said two coextensive scales extending from a first location to a second location on said first disc;

(j) a sight slide mounted to said disc along a track defined by said disc, said track running substantially parallel to said two co-extensive scales an opening provided in said sight, said opening being positionable over said cut out portion for accessing said map through said opening.

13. The instrument of claim 12 wherein said top disc has scales for subdividing the grid azimuth squares of the map into small subdivisions thereof.

14. The instrument of claim 13 wherein said cut out portion is a large arcuate cut-out portion to permit the user direct sighting of or contact with the map through the top disc.

15. A map reading and plotting instrument for use with a scaled map having means designating the north direction thereon comprising:

(a) a first disc having adjacent its periphery of at least one first scale means dividing the periphery in increments of angular measure;

(b) a second disc coaxially aligned and adjacent to said first disc, said second disc being disposed on the bottom of said first disc, said second disc including a cut-out portion;

(c) said second disc having a north-south diametral line to orientate the instrument with respect to the north direction of the map;

(d) a hollow securing means for connecting together with first and second discs at their respective centers for rotative movement independent of each other;

(e) at least one arm of flat, rectangular configuration and having at least one second scale means consisting of increments of linear measure corresponding to the scale of the mnap; and (f) said arm being disposed between said first and second discs to extend radially with respect to said discs and secured adjacent one end thereof to said hollow securing means for pivotal movement independent of the first and second discs;

(g) a sight and a sight connection and guide means for connecting said sight to said first disc and guiding said sight along a guide path between a first and second location for movement relative to a third scale and an opening provided in said sight, said opening being positionable over said cut-out portion of accessing said map through said opening.

16. The instrument of claim 15 wherein said arm is dimensioned in length so as to extend slightly beyond the peripheries of the first and second discs to enable user to engage and pivotally move the arm; and 17. The instrument of claim 15 wherein the discs and said arm are each being made of flat, transparent material and about 0.079 centimeters in thickness.

* * * * *